United States Patent
Oguchi et al.

(10) Patent No.: US 10,592,730 B2
(45) Date of Patent: Mar. 17, 2020

(54) PERSON TRACKING SYSTEM AND PERSON TRACKING METHOD

(71) Applicant: Panasonic i-PRO Sensing Solutions Co., Ltd., Fukuoka (JP)

(72) Inventors: Takae Oguchi, Fukuoka (JP); Muneo Yamamoto, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 15/540,544

(22) PCT Filed: Dec. 17, 2015

(86) PCT No.: PCT/JP2015/006290
§ 371 (c)(1),
(2) Date: Jun. 28, 2017

(87) PCT Pub. No.: WO2016/110903
PCT Pub. Date: Jul. 14, 2016

(65) Prior Publication Data
US 2017/0351906 A1    Dec. 7, 2017

(30) Foreign Application Priority Data

Jan. 8, 2015   (JP) ................................ 2015-002385

(51) Int. Cl.
*G06K 9/00* (2006.01)
*G06T 7/20* (2017.01)
(Continued)

(52) U.S. Cl.
CPC ..... *G06K 9/00255* (2013.01); *G06F 3/04817* (2013.01); *G06K 9/00* (2013.01);
(Continued)

(58) Field of Classification Search
None
See application file for complete search history.

(56) References Cited

U.S. PATENT DOCUMENTS 7,806,604 B2 *  10/2010  Bazakos ............ G06K 9/00255
                                                          348/153
8,073,206 B2 *  12/2011  Kamiyama ............ H04N 7/181
                                                          348/143
(Continued)

FOREIGN PATENT DOCUMENTS

JP    2006-146323 A    6/2006
JP    2008-219570 A    9/2008
(Continued)

OTHER PUBLICATIONS

International Search Report, dated Mar. 8, 2016, for corresponding International Application No. PCT/JP2015/006290, 4 pages.

*Primary Examiner* — Tyler W. Sullivan
(74) *Attorney, Agent, or Firm* — Seed IP Law Group LLP

(57) ABSTRACT

In surveillance camera system (10), face detection is performed with Cam-A or Cam-F and in a case where there is a match with the face image of a specific person as a result of collation of face images, appearance feature information is transmitted from tracking client (30) to other Cam-B to Cam-E grouped in association with Cam-A or Cam-F. Upon detecting the appearance feature information, the other Cam-B to Cam-E transmit the person discovery information to a tracking client (30).

17 Claims, 11 Drawing Sheets

(51) Int. Cl.
*G06T 7/292* (2017.01)
*G08B 13/196* (2006.01)
*H04N 5/232* (2006.01)
*H04N 7/18* (2006.01)
*G06F 3/0481* (2013.01)

(52) U.S. Cl.
CPC ..... *G06K 9/00268* (2013.01); *G06K 9/00288* (2013.01); *G06K 9/00295* (2013.01); *G06K 9/00771* (2013.01); *G06T 7/20* (2013.01); *G06T 7/292* (2017.01); *G08B 13/196* (2013.01); *G08B 13/19608* (2013.01); *G08B 13/19641* (2013.01); *G08B 13/19654* (2013.01); *G08B 13/19682* (2013.01); *G08B 13/19693* (2013.01); *H04N 5/23203* (2013.01); *H04N 5/23219* (2013.01); *H04N 7/18* (2013.01); *H04N 7/181* (2013.01); *G06T 2207/10016* (2013.01); *G06T 2207/30201* (2013.01); *G06T 2207/30232* (2013.01); *H04N 5/23296* (2013.01)

(56) References Cited

U.S. PATENT DOCUMENTS

| | | | | |
|---|---|---|---|---|
| 8,254,633 | B1* | 8/2012 | Moon | G06K 9/00771 382/103 |
| 8,284,255 | B2 | 10/2012 | Yokomitsu | |
| 9,251,599 | B2* | 2/2016 | Hirasawa | G06T 7/2093 |
| 9,357,181 | B2* | 5/2016 | Fujimatsu | G06K 9/00362 |
| 9,424,464 | B2 | 8/2016 | Monta et al. | |
| 9,453,904 | B2* | 9/2016 | Moshfeghi | G01S 5/0263 |
| 9,478,071 | B2* | 10/2016 | Hilton | G07C 11/00 |
| 9,781,336 | B2* | 10/2017 | Yoshio | H04N 5/23212 |
| 10,198,625 | B1* | 2/2019 | Shin | H04W 4/02 |
| 2003/0190076 | A1* | 10/2003 | DeLean | G06F 21/32 382/209 |
| 2005/0163346 | A1* | 7/2005 | van den Bergen | G06K 9/00771 382/103 |
| 2009/0052747 | A1 | 2/2009 | Kamiyama et al. | |
| 2009/0324010 | A1* | 12/2009 | Hou | G06K 9/00771 382/103 |
| 2009/0324020 | A1* | 12/2009 | Hasebe | G06K 9/00228 382/115 |
| 2010/0097475 | A1 | 4/2010 | Yokomitsu | |
| 2010/0157049 | A1* | 6/2010 | Dvir | G08B 13/19608 348/143 |
| 2010/0318566 | A1* | 12/2010 | Yoshio | G06K 9/00228 707/774 |
| 2012/0026335 | A1* | 2/2012 | Brown | G01S 5/16 348/159 |
| 2013/0155229 | A1* | 6/2013 | Thornton | H04N 7/18 348/143 |
| 2014/0226855 | A1* | 8/2014 | Savvides | G06K 9/00771 382/103 |
| 2015/0085128 | A1* | 3/2015 | Pineau | G08B 13/19608 348/150 |
| 2015/0098632 | A1 | 4/2015 | Monta et al. | |
| 2016/0086015 | A1* | 3/2016 | Irmatov | G06K 9/00281 382/103 |
| 2016/0239711 | A1* | 8/2016 | Gong | G06K 9/00295 |
| 2016/0269685 | A1* | 9/2016 | Jessop | G06F 3/012 |
| 2016/0379225 | A1* | 12/2016 | Rider | G06Q 30/0201 382/116 |
| 2017/0017833 | A1* | 1/2017 | Watanabe | H04N 5/915 |

FOREIGN PATENT DOCUMENTS

| | | |
|---|---|---|
| JP | 2013-153304 A | 8/2013 |
| JP | 2013-247586 A | 12/2013 |
| JP | 5500303 B1 | 5/2014 |

* cited by examiner

| | | | |
|---|---|---|---|
| ★ Cam-A | Cam-B | | |
| Cam-B | Cam-A | Cam-C | Cam-D |
| Cam-C | Cam-B | Cam-F | |
| Cam-D | Cam-B | Cam-C | Cam-E |
| Cam-E | Cam-D | | |
| ★ Cam-F | Cam-C | | |

PERSON TRACKING SYSTEM AND PERSON TRACKING METHOD

TECHNICAL FIELD

The present disclosure relates to a person tracking system and a person tracking method for tracking a person in cooperation with a plurality of surveillance cameras.

BACKGROUND ART

In the related art, a surveillance camera system that specifies a suspicious person from the images captured by surveillance cameras by using many surveillance cameras installed in a facility, for example, is known.

As the prior technique related to a surveillance camera system that specifies a suspicious person using a plurality of surveillance cameras, the surveillance camera system disclosed in PTL 1 has been proposed.

It is known that the surveillance camera system disclosed in PTL 1 extracts a feature amount of a suspicious person from the images captured with the surveillance cameras of each surveillance device and collates the feature amount with feature amount of a previously registered suspicious person list, and transmits data such as the face images and the feature amount of the suspicious person to other surveillance devices and a mobile terminal registered in advance in a case where it is determined that the feature amount matches or approximates a feature amount in a certain surveillance device as a result of the collation. In this way, it possible to track a surveillance visual field range of each surveillance device, and then predict where a suspicious person is.

CITATION LIST

Patent Literature

PTL 1: Japanese Patent Unexamined Publication No. 2013-153304

SUMMARY OF THE INVENTION

The person tracking system of the present disclosure includes: a storage device that stores a face image related to a specific person; at least one first detection camera that has a function of detecting face and appearance features of a person; at least one second detection camera that has a function of detecting an appearance feature of the person; a collation device that collates a face image of the person detected by the first detection camera with the face image related to the specific person stored in the storage device; and an instruction device that has grouping information of at least one first detection camera and at least one second detection camera. In a case where it is determined that the face image of the person detected by the first detection camera is the face image related to the specific person, the collation device transmits person feature information including appearance feature information on the specific person to the instruction device. The instruction device instructs at least one second detection camera grouped in association with the first detection camera to detect the appearance feature information included in the person feature information transmitted from the collation device. Any second detection camera grouped in association with the first detection camera transmits the detection information that is obtained by detecting the appearance feature information transmitted from the instruction device to the instruction device.

In addition, the person tracking method of the present disclosure includes: a step of storing a face image related to a specific person in a storage device; a step of storing grouping information of at least one first detection camera that has a function of detecting face and appearance features of a person and at least one second detection camera that has a function of detecting an appearance feature of the person in an instruction device; a step of collating a face image of the person detected by the first detection camera with the face image related to the specific person stored in the storage device; a step of transmitting person feature information including appearance feature information on the specific person to the instruction device in a case where it is determined that the face image of the person detected by the first detection camera is the face image related to the specific person; a step of instructing at least one second detection camera grouped in association with the first detection camera to detect the appearance feature information included in the transmitted person feature information; and a step of transmitting detection information that is obtained by detecting the appearance feature information transmitted from the instruction device to the instruction device.

DESCRIPTION OF EMBODIMENTS

Before describing the embodiment of the present disclosure, the problems in the related technique will be briefly described. In the related technique including the above-described PTL 1, in some cases, it is difficult to perform highly accurate collation with all the surveillance cameras even in the case of using a plurality of surveillance cameras. That is, depending on the installation environment of the surveillance cameras, imaging conditions such as brightness and an imaging angle are different and a captured image suitable for collation cannot be acquired, so the accuracy of collation may be insufficient in some cases. As a result, there is a case where a wrong information such as a face image of another person who is different from the suspicious person is transmitted and a security guard is confused.

In the configuration of the above-described PTL 1, since all the surveillance devices transmit only data (highly accurate information) such as a feature amount and a face image acquired by image processing of images captured with each surveillance camera (in other words, all the surveillance devices do not transmit suspicious information as to whether or not it is a suspicious person), there is a possibility that information that a suspicious person is discovered is not gathered sufficiently in a mobile terminal possessed by a security guard and the suspicious person is missed.

In addition, since the suspicious person information indicating that the suspicious person is discovered is transmitted to the surveillance device and the mobile terminals installed in all the surveillance visual field ranges constituting the surveillance camera system, there is also a problem that the information transfer amount of suspicious person information also increases and the processing load on the surveillance device on a receiving side also increases.

Hereinafter, an embodiment (hereinafter, referred to as "the present embodiment") which specifically discloses the person tracking system and the person tracking method according to the present disclosure will be described with reference to the drawings. The person tracking system of the present embodiment is applied to a surveillance camera system using, for example, a plurality of surveillance cameras.

Figure 1:
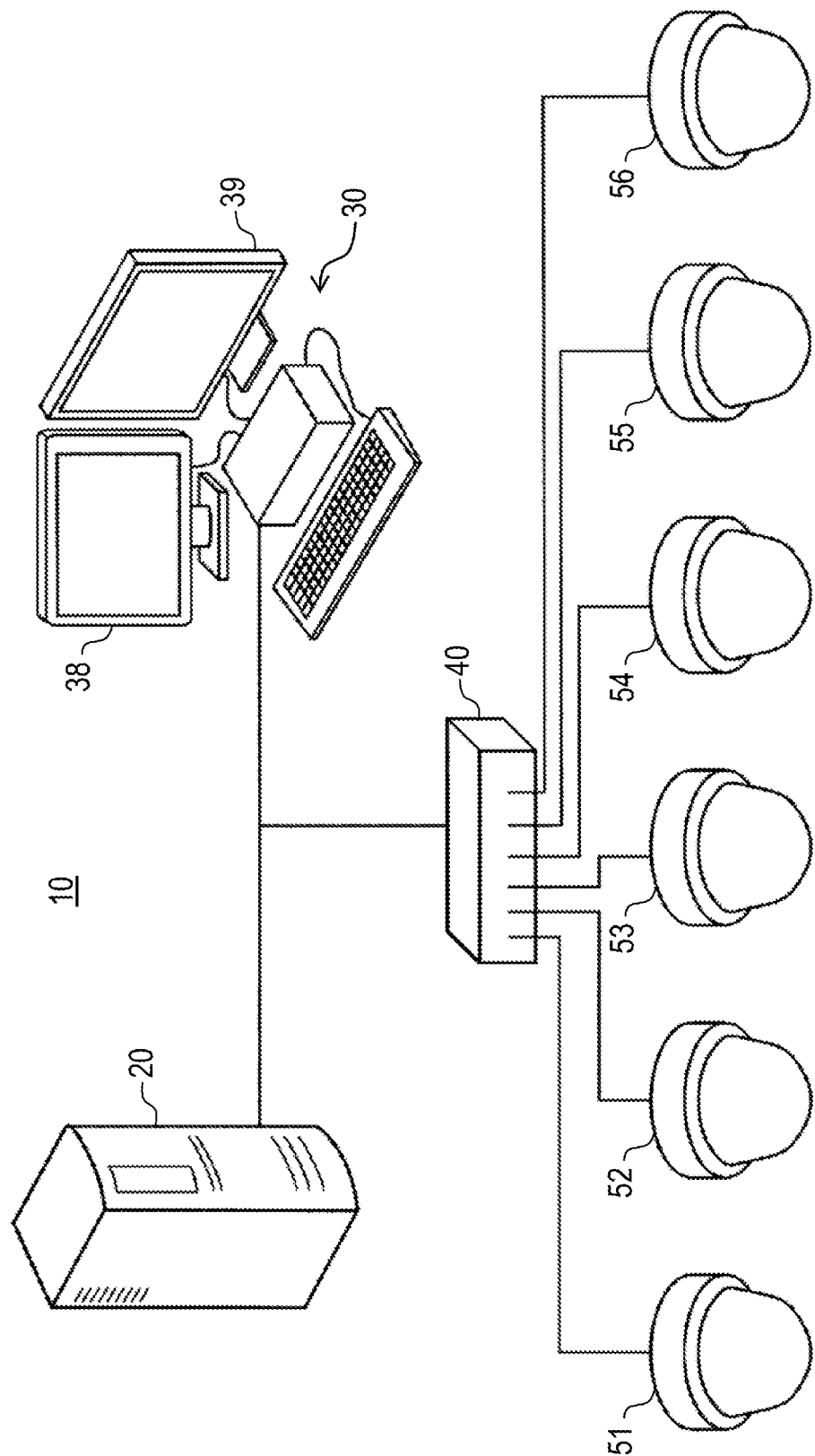
FIG. 1 is a diagram showing an example of a schematic configuration of a surveillance camera system of the present embodiment.
Figure 2:
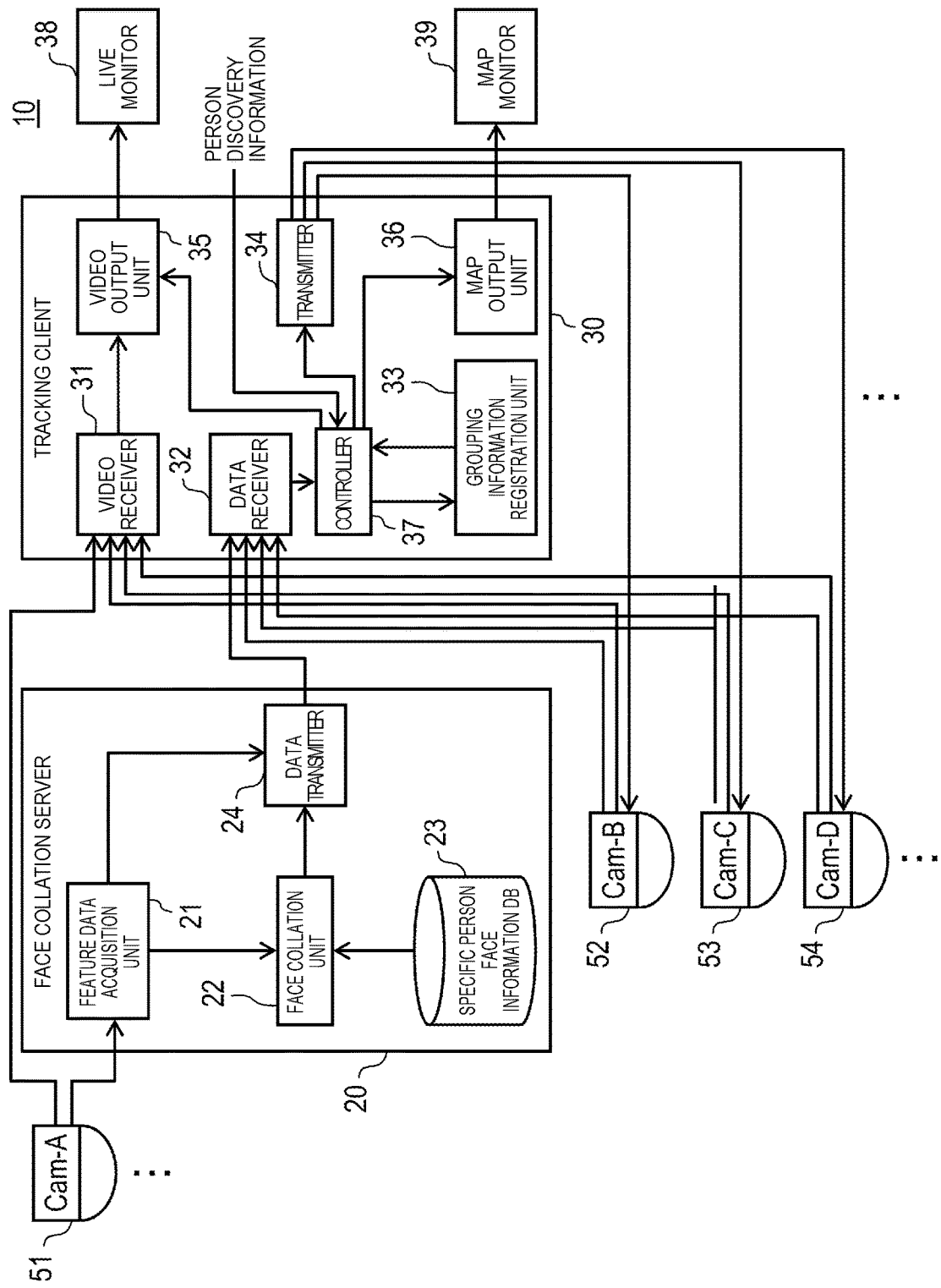
FIG. 2 is a block diagram showing an example of a hardware configuration of the surveillance camera system of the present embodiment.

FIG. 1 is a diagram showing an example of a schematic configuration of surveillance camera system 10 of the present embodiment. Surveillance camera system 10 includes face collation server 20, tracking client 30, switching hub 40, and a plurality of surveillance cameras 51 to 56 (cameras 51-54 are also shown in FIG. 2).

Face collation server 20 (collation device) collates the thumbnails of the face images transmitted from surveillance cameras 51 and 56 with a face image registered in advance and transmits the information of the corresponding person to tracking client 30 in a case where those images match as a result of the collation. The information transmitted to tracking client 30 includes thumbnails of the face images of a person detected in the surveillance cameras 51 and 56, identification numbers of the surveillance cameras (hereinafter, referred to as a "camera number") acquired as a result of collation, and appearance feature information of the person. An appearance feature includes, for example, the color or shape of clothes, the shape of possessions, the logo (brand name) attached to clothes, and the like.

When tracking client 30 (instruction device) is notified that the face images match as a result of collation with face collation server 20, tracking client 30 transmits the appearance feature information to other surveillance cameras (for example, surveillance cameras 52, 53, 54, and 55).

Surveillance cameras 51 to 56 image respective target monitoring areas and output the captured images as videos. Surveillance cameras 51 and 56 have a function of detecting a face image and an appearance feature of a person, detect the face image included in the captured images, and transmit the thumbnail and appearance feature information of the face image to face collation server 20. Other surveillance cameras 52, 53, 54, and 55 do not have a face detection function and have only a function of detecting an appearance feature, and notify tracking client 30 of a camera number in a case where surveillance cameras 52, 53, 54, and 55 detect the appearance feature included in the captured images. Surveillance cameras 51 to 56 may be an omnidirectional camera, a pan-tilt-zoomable PTZ camera, or a fixed camera with a fixed imaging angle of view.

Hereinafter, for the convenience of description, surveillance camera 51 is referred to as "Cam-A". Similarly, surveillance cameras 52, 53, 54, 55, and 56 are referred to as "Cam-B", "Cam-C", "Cam-D", "Cam-E", and "Cam-F", respectively.

Switching hub 40 concentrates the communication lines of Cam-A to Cam-F and controls the communication connection between Cam-A to Cam-F and face collation server 20 or tracking client 30.

FIG. 2 is a block diagram showing an example of a hardware configuration of surveillance camera system 10 of the present embodiment. Face collation server 20 includes feature data acquisition unit 21, face collation unit 22, specific person face information DB (database) 23, and data transmitter 24.

The feature data acquisition unit 21 obtains thumbnails of the face images and data on the appearance features included in the captured images captured with Cam-A or Cam-F (the first detection camera).

Face collation unit 22 collates the thumbnails of the face images acquired by the feature data acquisition unit 21 with a face image registered in specific person face information DB 23 and transmits the result of the collation and the camera number to data transmitter 24.

As a result of the collation, in a case where it is determined that the face images match, data transmitter 24 transmits the camera number (also referred to as "Cam No") and the thumbnail and the appearance feature information of the face image acquired by feature data acquisition unit 21 to tracking client 30 as a result of the collation.

Figures 3, 4:
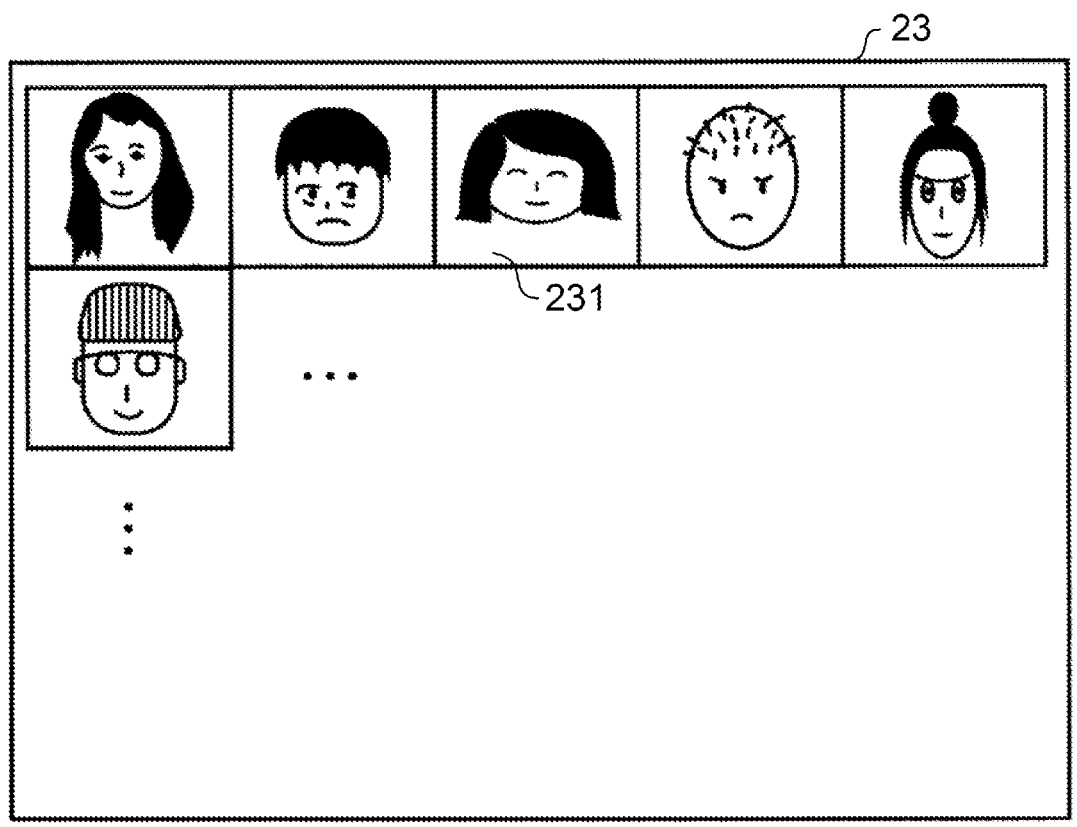
FIG. 3 is a diagram showing an example of face image data registered in a specific person face information DB.
FIG. 4 is a table showing an example of registered contents of a grouping information registration unit.

In specific person face information DB 23 (storage device), face image data of a specific person such as a suspicious person is registered. FIG. 3 is a diagram showing an example of face image data registered in specific person face information DB 23. Specific person face information DB 23 also includes face image 231 of search target X to be described later.

Tracking client 30 includes video receiver 31, data receiver 32, controller 37, grouping information registration unit 33, transmitter 34, video output unit 35, and map output unit 36.

Video receiver 31 receives all the captured images captured with Cam-A to Cam-F and outputs the images to video output unit 35 as they are.

Data receiver 32 receives the information (including a camera number, appearance feature information, and a thumbnail of a face image as a result of collation) transmitted from face collation server 20 and the information (here, a camera number indicating that an appearance feature is detected) transmitted from Cam-B to Cam-E (the second detection cameras).

In a case where the result of collation received by data receiver 32 has a match, controller 37 transmits a camera number to grouping information registration unit 33 and acquires camera numbers linked (grouped) with the camera number. Controller 37 instructs the surveillance cameras with the linked camera numbers to transmit the appearance feature information to transmitter 34. Controller 37 instructs video output unit 35 to display in a multi-screen display and instructs map output unit 36 to transmit the camera numbers and display blinking camera icons on a map image displayed on map monitor 39 (shown additionally in FIG. 1).

Transmitter 34 transmits the appearance feature information to the surveillance cameras with the linked camera numbers in accordance with the instruction from controller 37.

In grouping information registration unit 33, grouping information of surveillance cameras set for each surveillance camera is registered. FIG. 4 is a table showing an example of registered contents of grouping information registration unit 33. Here, the surveillance cameras that are adjacent are set as grouping. For example, adjacent Cam-B is set for Cam-A. Adjacent Cam-A, Cam-C, and Cam-D are set for Cam-B. Adjacent Cam-B and Cam-F are set for Cam-C. Adjacent Cam-B, Cam-C, and Cam-E are set for Cam-D. Adjacent Cam-D is set for Cam-E. Adjacent Cam-C is set for Cam-F.

Here, one adjacent surveillance camera is included in the grouping but the way of setting the grouping is not limited thereto. For example, the surveillance cameras which are not directly adjacent but installed apart from one or more surveillance cameras in the same passageway may be set as a grouping. In this way, instead of adjacent surveillance cameras, it is also possible to set surveillance cameras that are considered to be located at positions where search target X is likely to be discovered. In addition, it is possible to set all the surveillance cameras within a certain distance from a target surveillance camera as a grouping. In this way, it is possible to monitor in consideration of the moving distance of search target X.

Video output unit 35 is connected to live monitor 38 (shown additionally in FIG. 1) provided outside the case body of tracking client 30 and displays the captured images (images) captured with Cam-A to Cam-F on live monitor 38 (a first display device) on multiple screens in accordance with the instruction from the controller 37. The live monitor 38 can divide the screen into, for example, 64 channels and display each captured image.

Similarly to live monitor 38, map output unit 36 is connected to map monitor 39 provided outside the case body of tracking client 30 and displays the map information (a map image) of a facility where Cam-A to Cam-F are installed on map monitor 39 (a second display device) in accordance with the instruction from the controller 37. Map monitor 39 displays the map image on which the camera icons of Cam-A to Cam-F are drawn on a screen.

An operation of the surveillance camera system 10 having the above-described configuration is shown.

Figure 5A:
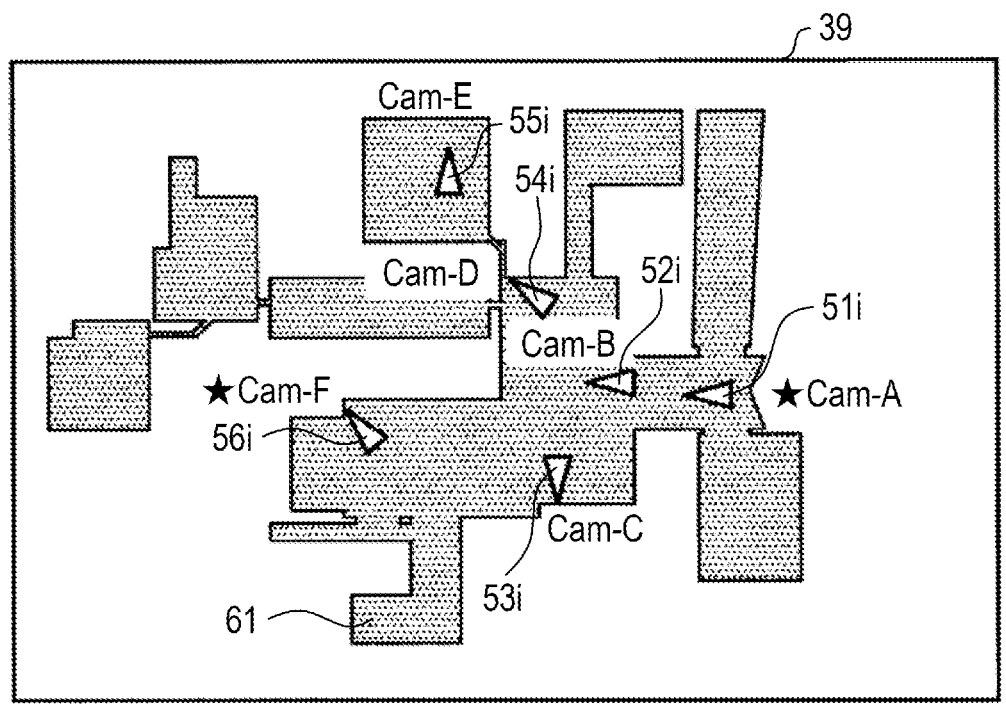
FIG. 5A is a diagram showing an example of an initial screen of a map monitor.
Figure 5B:
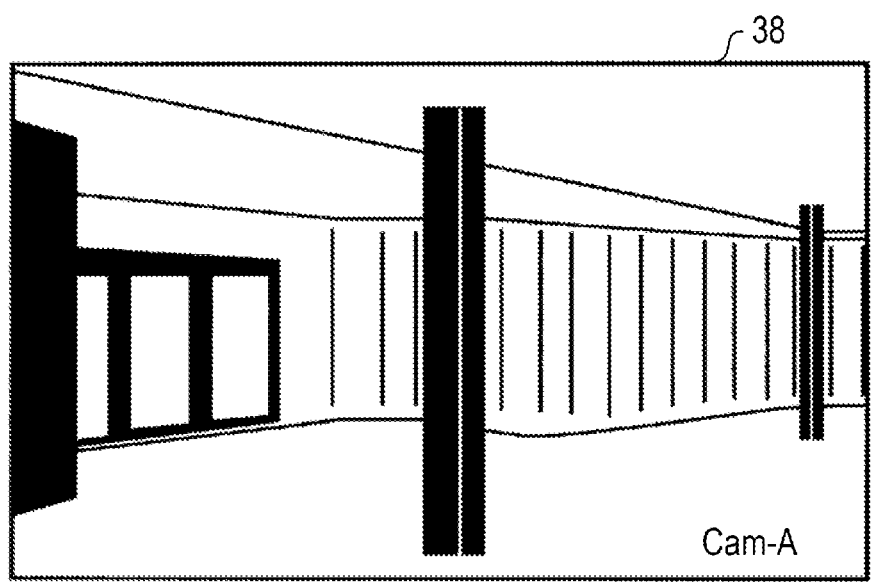
FIG. 5B is a diagram showing an example of an initial screen of a live monitor.

When surveillance camera system 10 is activated, map monitor 39 and live monitor 38 display an initial screen, respectively. FIG. 5A is a diagram showing an example of an initial screen of map monitor 39. On the initial screen of map monitor 39, camera icons 51i to 56i indicating that Cam-A to Cam-F are installed are displayed so as to overlap map image 61 of the facility. On the initial screen, all camera icons 51i to 56i are displayed as a default. FIG. 5B is a diagram showing an example of an initial screen of live monitor 38. On the initial screen of live monitor 38, a captured image (video) captured with Cam-A installed at the entrance of the facility is displayed over a wide area on one screen. Also, at the bottom of the screen, a camera number (Cam-A in this case) is displayed.

Figure 6:
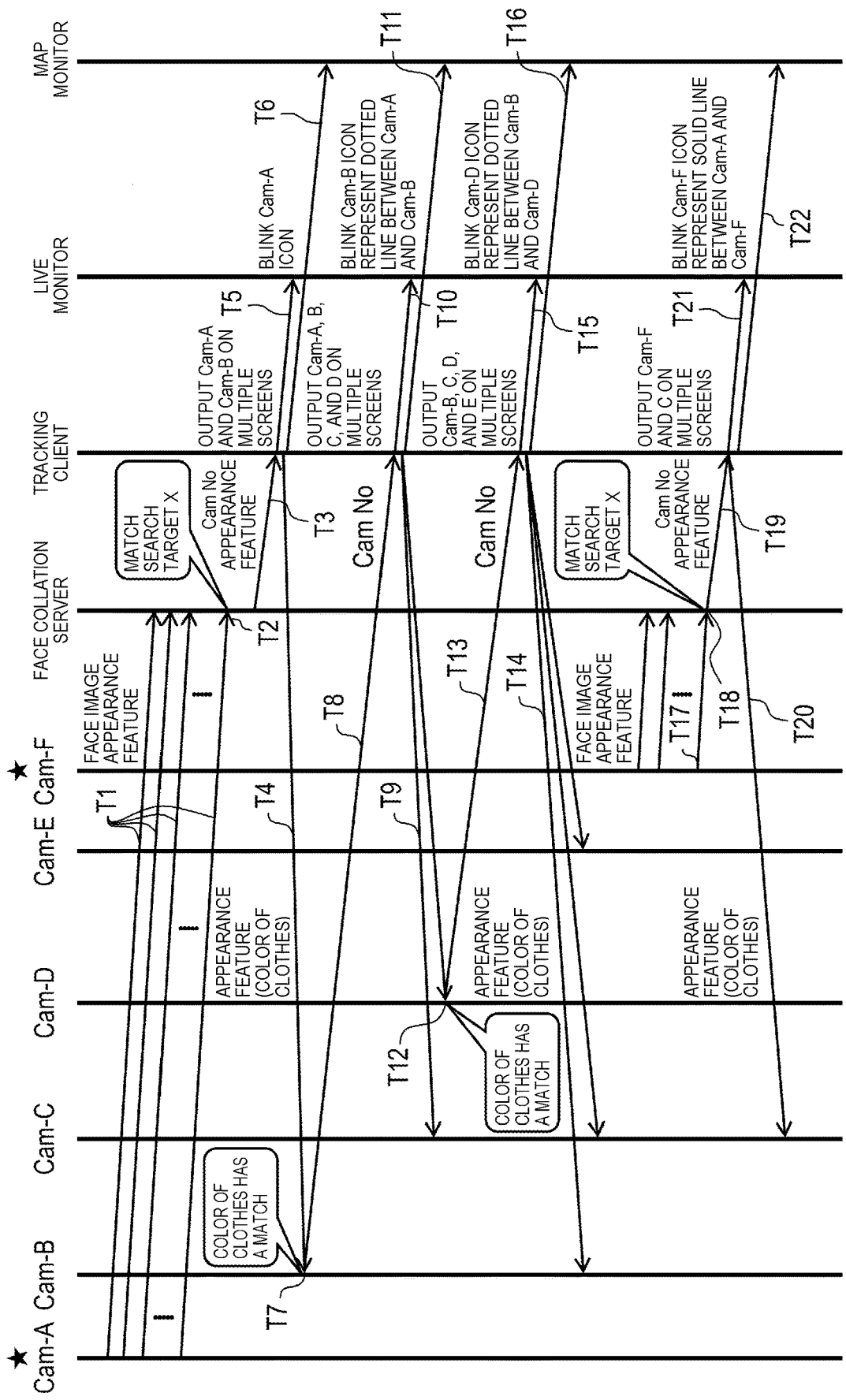
FIG. 6 is a sequence diagram showing an example of a monitoring operation of the surveillance camera system of the embodiment.

FIG. 6 is a sequence diagram showing an example of a monitoring operation of surveillance camera system 10 of the present embodiment. All Cam-A to Cam-F image in real time and data of each captured image is constantly transmitted to tracking client 30. In addition, as described above, upon detecting a face image included in the captured images, Cam-A and Cam-F are surveillance cameras that can transmit the thumbnail, the camera number, and the appearance feature information of the face image to face collation server 20.

First, upon detecting that a face image is included in the images being captured in real time, Cam-A installed at the entrance of the facility transmits the thumbnail, the camera number, and appearance feature of the face image information to face collation server 20 (T1).

Figure 7A:
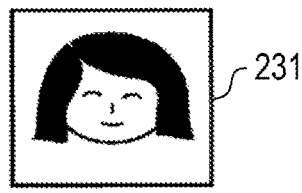
FIG. 7A is a diagram showing an example of a face image of a search target X in a case where search target X is discovered.
Figure 7B:
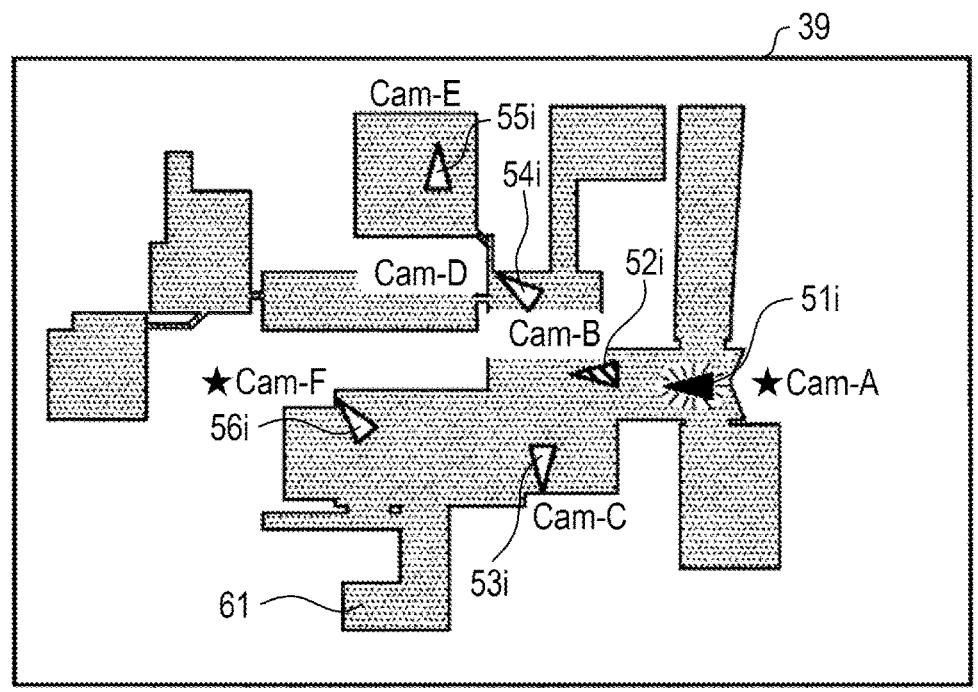
FIG. 7B is a diagram showing an example of a screen of the map monitor in a case where search target X is discovered.
Figure 7C:
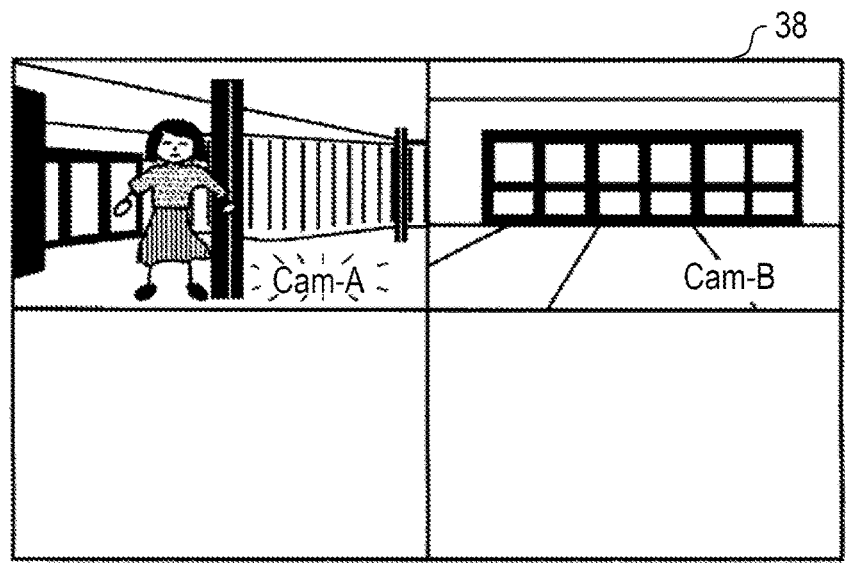
FIG. 7C is a diagram showing an example of a screen of the live monitor in a case where search target X is discovered.

When the face image of the thumbnail received from Cam-A matches a face image registered in specific person face information DB 23 (T2), face collation server 20 transmits the camera number, the appearance feature information, a result of the collation, and the thumbnail of the face image to tracking client 30 (T3). Here, as a result of the collation, a case where the face image of the thumbnail matches face image 231 of the search target X registered in specific person face information DB 23 will be described. FIGS. 7A to 7C are diagrams for explaining a monitoring operation in a case where search target X is discovered. FIG. 7A is a diagram showing an example of face image 231 of search target X registered in specific person face information DB 23 in a case where search target X is discovered.

Tracking client 30 refers to grouping information registration unit 33 and transmits appearance feature information to Cam-B linked with Cam-A (T4). In addition, tracking client 30 outputs the images captured with Cam-A and Cam-B to live monitor 38 in a multi-screen display so that the images can be contrasted (T5). FIG. 7C is a diagram showing an example of a screen of the live monitor 38 in a case where search target X is discovered. In this way, since surveillance camera system 10 causes live monitor 38 to display the image imaged with Cam-A on which search target X is shown, the observer can visually check that search target X is discovered.

Live monitor 38 adds a camera number to the images captured with Cam-A and Cam-B and displays the images on each screen while blinking and displaying the camera number of Cam-A as discovery information indicating that search target X is discovered by Cam-A. In this way, the observer is able to know instantly that there is a possibility that search target X is discovered and on which screen of live monitor 38 search target X is shown while comparing with the image captured by Cam-A in which the face image is detected.

In addition, tracking client 30 blinks camera icon 51*i* of Cam-A on map image 61 displayed on map monitor 39 while displaying camera icon 52*i* of Cam-B, which is linked with Cam-A, in a different color (T6). FIG. 7B is a diagram showing an example of a screen of map monitor 39 in a case where search target X is discovered. By blinking camera icon 51*i* of Cam-A in which search target X is discovered to make camera icon 51*i* distinguishable from other camera icons, it is possible to recognize instantly in which surveillance camera search target X is imaged.

In addition, by displaying camera icon 52*i* of Cam-B grouped in association with Cam-A in a color different from that of other camera icons, it is possible to recognize the position of a surveillance camera in which search target X is highly likely to be discovered again.

Figure 8A:
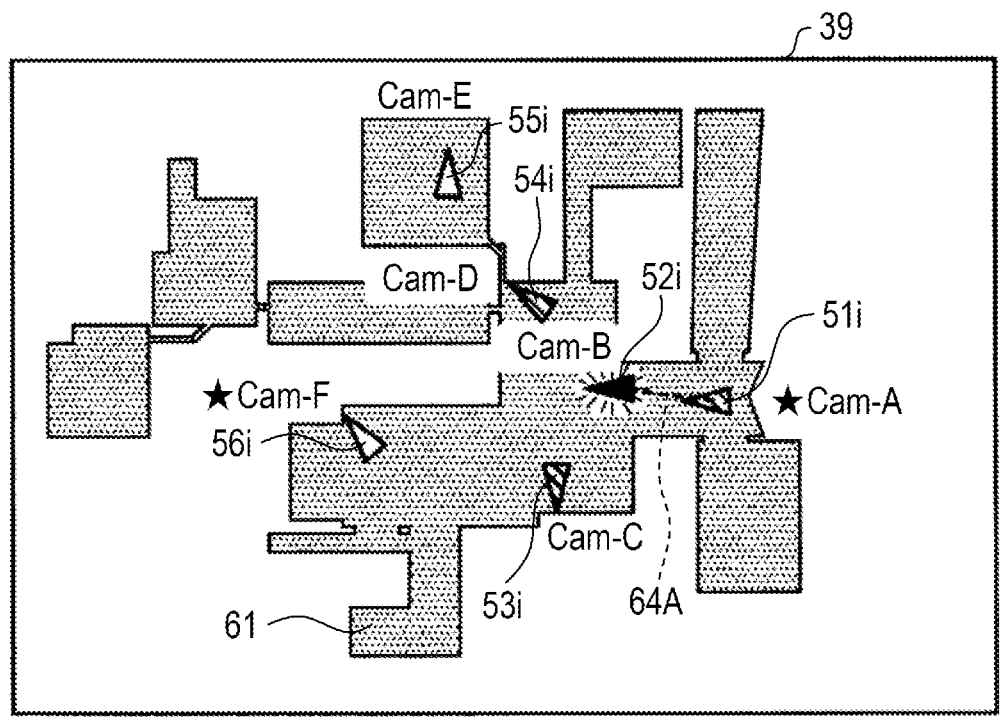
FIG. 8A is a diagram showing an example of a screen of the map monitor following FIG. 7A.
Figure 8B:
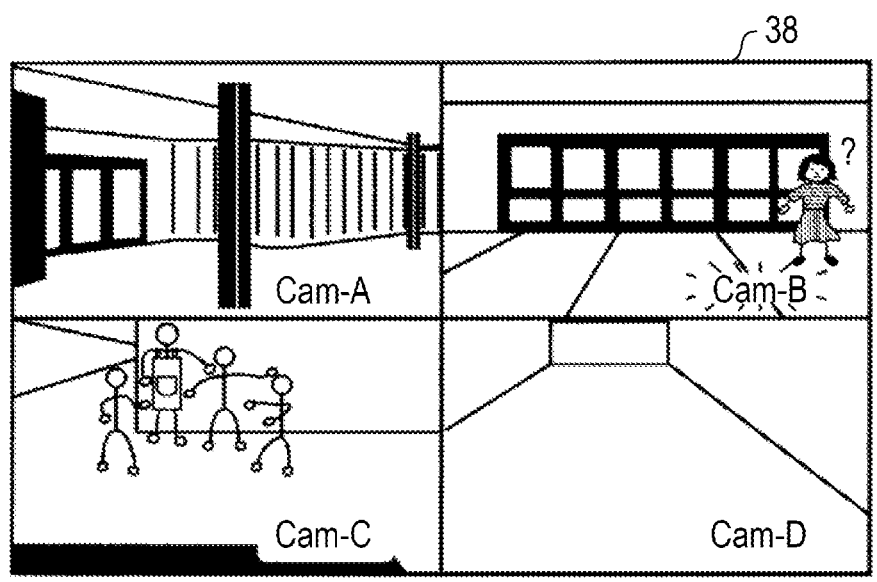
FIG. 8B is a diagram showing an example of a screen of the live monitor following FIG. 7B.

Upon detecting the appearance feature included in the captured images (T7), Cam-B notifies tracking client 30 of the camera number as there is a possibility that search target X is discovered (T8). FIGS. 8A and 8B are diagrams for explaining a monitoring operation following FIG. 7B and FIG. 8C. Tracking client 30 refers to grouping information registration unit 33 and transmits appearance feature information to Cam-C and Cam-D, which are linked with Cam-B (T9). At this time, since Cam-A has the appearance feature information, the appearance feature information is not transmitted to Cam-A. In addition, tracking client 30 outputs the images captured with Cam-A, Cam-B, Cam-C, and Cam-D to live monitor 38 in a multi-screen display (T10). FIG. 8B is a diagram showing an example of a screen of live monitor 38 following FIG. 7B. For a person having the appearance feature included in the screen of Cam-B, a mark "?" indicating that the person is a suspicious person is closely displayed as discovery temporary information.

Tracking client 30 blinks camera icon 52*i* of Cam-B on map image 61 displayed on map monitor 39 while displaying a dotted line between Cam-A and Cam-B and displays camera icon 51*i* of Cam-A, camera icon 53*i* of Cam-C, and camera icon 54*i* of Cam-D, which are linked with Cam-B, in different colors (T11). By displaying trace 64A between Cam-A and Cam-B as a dotted line, trace 64A is understood to be assumption information that search target X is predicted to have passed. FIG. 8A is a diagram showing an example of a screen of map monitor 39 following FIG. 7A.

Figure 9A:
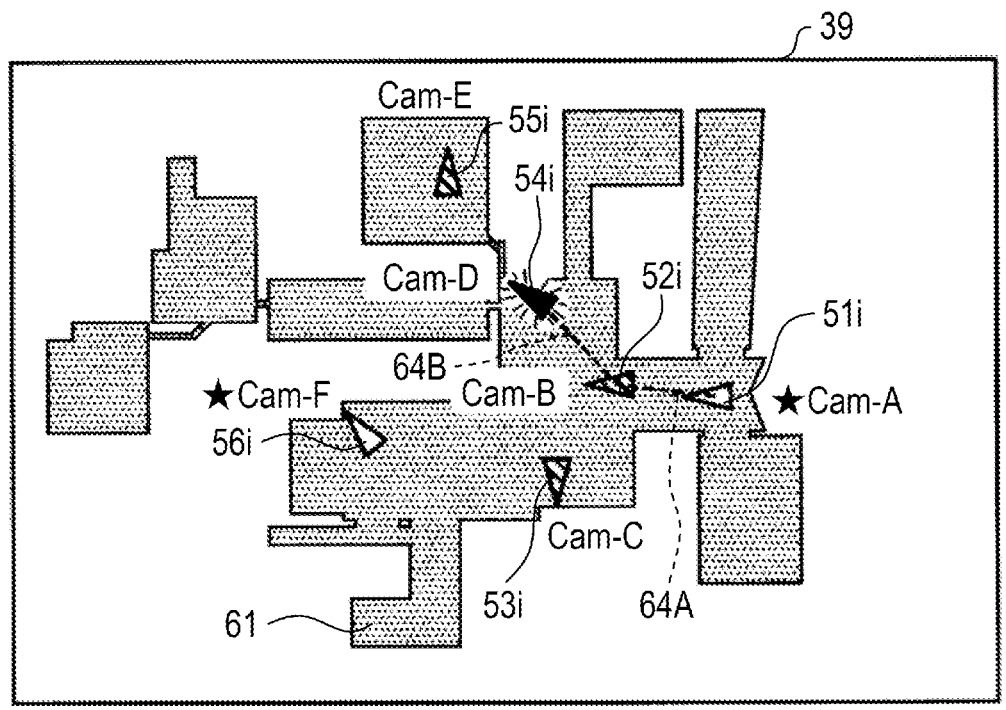
FIG. 9A is a diagram showing an example of a screen of the map monitor following FIG. 8A.
Figure 9B:
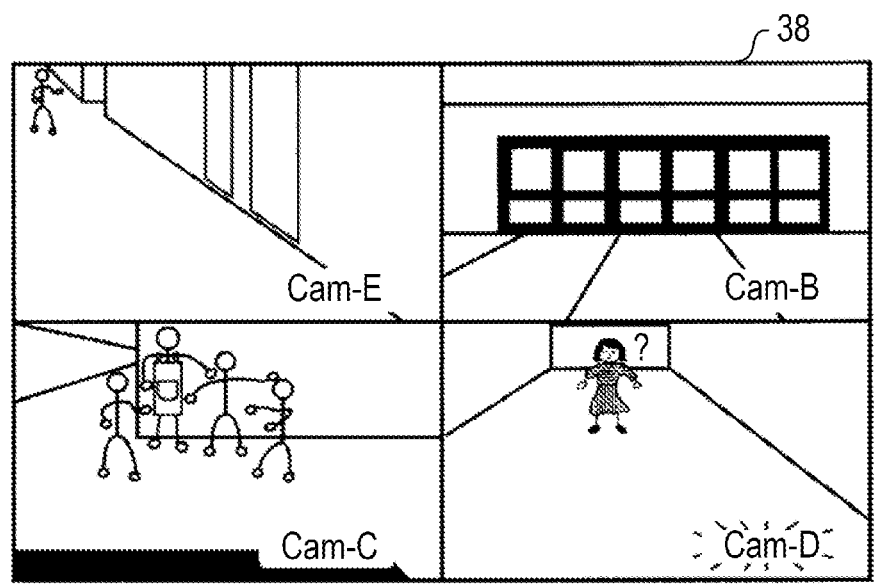
FIG. 9B is a diagram showing an example of a screen of the live monitor following FIG. 8B.

Upon detecting the appearance feature included in the captured image (T12), Cam-D notifies tracking client 30 of the camera number as there is a possibility that search target X is discovered (T13). FIGS. 9A and 9B are diagrams for explaining a monitoring operation following FIG. 8A and FIG. 8B. Tracking client 30 refers to grouping information registration unit 33 and transmits appearance feature information to Cam-B, Cam-C, and Cam-E, which are linked with Cam-D (T14). In addition, tracking client 30 outputs the images captured with Cam-B, Cam-C, Cam-D, and Cam-E to live monitor 38 in a multi-screen display (T15). FIG. 9B is a diagram showing a screen of live monitor 38 following FIG. 8B.

Tracking client 30 blinks camera icon 54*i* of Cam-D on map image 61 displayed on map monitor 39 while displaying trace (a first trace) 64B between Cam-B and Cam-D with a dotted line following the line between Cam-A and Cam-B and displays camera icon 52*i* of Cam-B, camera icon 53*i* of Cam-C, and camera icon 55*i* of Cam-E, which are linked with Cam-D, in different colors (T16). Trace 64B between Cam-A, Cam-B, and Cam-D represented by a dotted line is understood to be assumption information that search target X is predicted to have passed. FIG. 9A is a diagram showing an example of a screen of map monitor 39 following FIG. 8A.

Thereafter, upon detecting the face image included in the captured images, Cam-F transmits the thumbnail of the face image, the camera number, and the appearance feature information to face collation server 20 (T17).

Figure 10A:
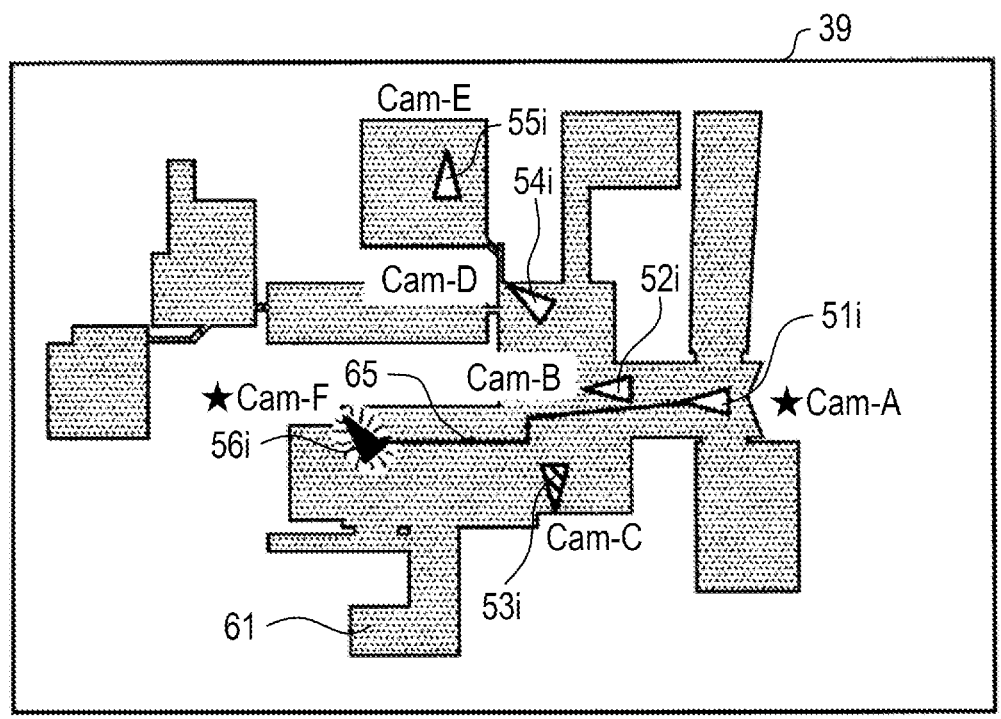
FIG. 10A is a diagram showing an example of a screen of the map monitor in a case where search target X is discovered again.
Figure 10B:
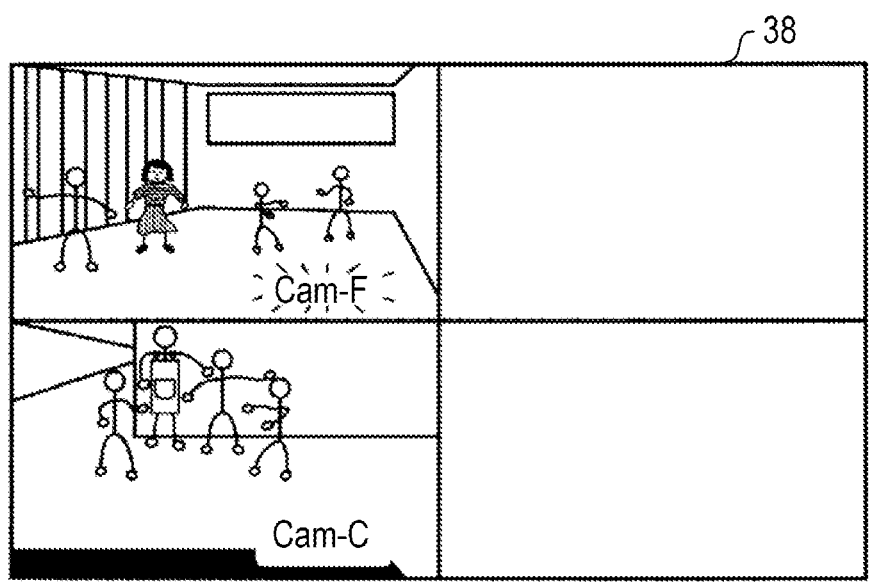
FIG. 10B is a diagram showing an example of a screen of the live monitor in a case where search target X is discovered again.

When the face image of the thumbnail received from Cam-F matches a face image registered in specific person face information DB 23 (T18), face collation server 20 transmits the camera number and the appearance feature information to tracking client 30 (T19). Here, it is assumed that the face image of search target X already being tracked has a match. FIGS. 10A and 10B are diagrams for explaining a monitoring operation in a case where search target X is discovered again.

Tracking client 30 refers to grouping information registration unit 33 and transmits appearance feature information to Cam-C linked with Cam-F (T20). In addition, tracking client 30 outputs the images captured with Cam-F and Cam-C to live monitor 38 in a multi-screen display (T21). FIG. 10B is a diagram showing an example of a screen of live monitor 38 in a case where search target X is discovered again. Tracking client 30 blinks camera icon 56*i* of Cam-F on map image 61 displayed on map monitor 39 while displaying trace (a second trace) 65 between Cam-A and Cam-F with a solid line and displays camera icon 53*i* of Cam-C linked with Cam-F in a different color (T22). FIG. 10A is a diagram showing an example of a screen of map monitor 39 in a case where search target X is discovered again. Trace 65 between Cam-A and Cam-F represented by a solid line is understood to be certain information that search target X is determined to have passed. At this time, tracking client 30 erases traces 64A and 64B between Cam-A and Cam-D which are represented by dotted lines as assumption information. In this way, since tracking client 30 can erase wrong traces 64A and 64B between Cam-A and Cam-D in map monitor 39, it is easy for the observer to see trace 65 of exact search target X. In addition, for example, even in a case where search target X changes the clothes on the way, since the face image and the appearance feature detected by Cam-F are transmitted again to tracking client 30, the appearance feature is updated to allow further tracking.

In this way, it is possible to clearly distinguish between uncertain assumption information that search target X is considered to have passed and certain information that is confirmed that search target X has passed and to easily predict the position of search target X.

In addition, when search target X is discovered in Cam-F, in a case where it is determined that the travel time of search target X since search target X is discovered by Cam-A is longer than the time assumed from the distance between Cam-A and Cam-F, for example, in a case where the travel time is the time during which search target X has moved at a walking speed of ⅓ or less than normal, tracking client 30 displays the trace between Cam-A and Cam-F with a dotted line indicating assumption information, not with a solid line indicating certain information as search target X is likely to make a detour. In this way, the observer can determine that there is a concern that search target X is making a detour and that the trace may not be accurate.

Figure 11A:
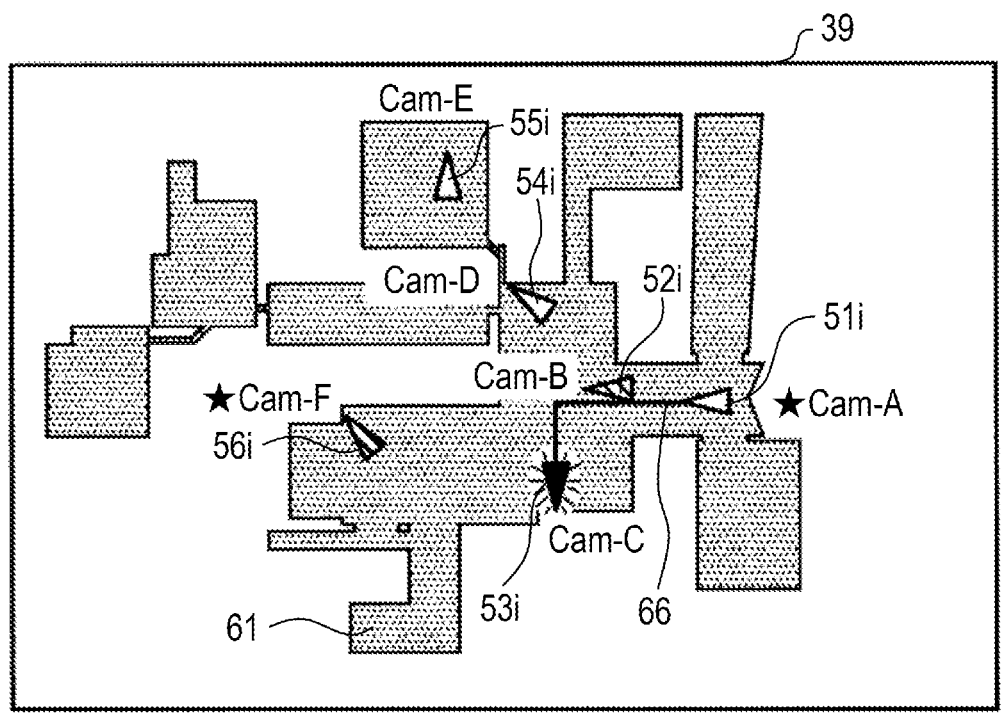
FIG. 11A is a diagram showing an example of a screen of the map monitor in a case where an observer finds search target X by watching live monitor 38.
Figure 11B:
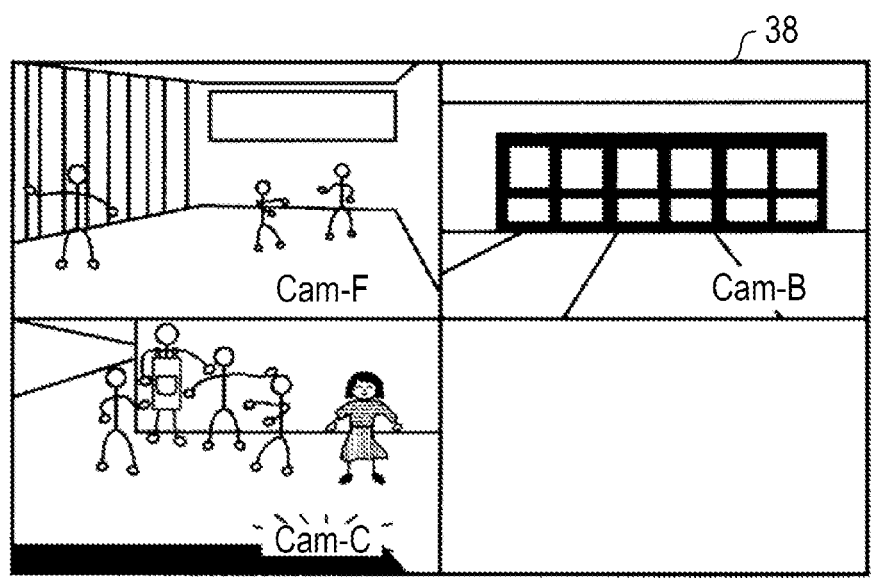
FIG. 11B is a diagram showing an example of a screen of the live monitor in a case where the observer finds search target X by watching live monitor 38.

FIGS. 11A and 11B are diagrams for explaining a monitoring operation in a case where the observer discovers search target X by watching live monitor 38.

FIG. 11B is a diagram showing an example of a screen of live monitor 38 in a case where the observer discovers search target X by watching live monitor 38. When the observer is watching live monitor 38 and discovers search target X, the observer performs an operation to notify tracking client 30 that search target X is discovered. For example, in a case where live monitor 38 is a touch panel, the observer touches the screen on which the captured image of Cam-C is displayed so that the discovery information of search target X (the camera number) is notified to controller 37 of tracking client 30.

FIG. 11A is a diagram showing an example of a screen of map monitor 39 in a case where an observer finds search target X by watching live monitor 38. Tracking client 30 blinks camera icon 53i of Cam-C on map image 61 displayed on map monitor 39 while displaying trace 66 between Cam-A and Cam-C with a solid line and displays camera icon 52i of Cam-B and camera icon 56i of Cam-F, which are linked with Cam-C, in different colors.

In surveillance camera system 10, face detection is performed with Cam-A or Cam-F and in a case where there is a match with the face image of a specific person as a result of collation of face images, appearance feature information is transmitted from tracking client 30 to other Cam-B to Cam-E grouped in association with Cam-A or Cam-F. Upon detecting the appearance feature information, the other Cam-B to Cam-E transmit the person discovery information (the camera number) to tracking client 30.

In this way, even if all the surveillance cameras do not have the face detection function, that is, even if all the surveillance cameras are a relatively inexpensive surveillance camera that has only the appearance feature detection function, the tracking client can acquire a lot of person discovery information using appearance feature information such as clothes color and can track search target X.

Accordingly, surveillance camera system 10 collects not only highly accurate information (for example, a face image) for specifying a person but also low-accuracy information for specifying a person (for example, an appearance feature) and can predict the location of a specific person with high accuracy. In this way, tracking accuracy improves. In addition, by transmitting appearance feature information only to surveillance cameras grouped in association with a surveillance camera that has detected the face image or an appearance feature of a specific person, there is no need to give unnecessary load on the other surveillance cameras that are not grouped.

(Modification Example of the Present Embodiment)

Figure 12:
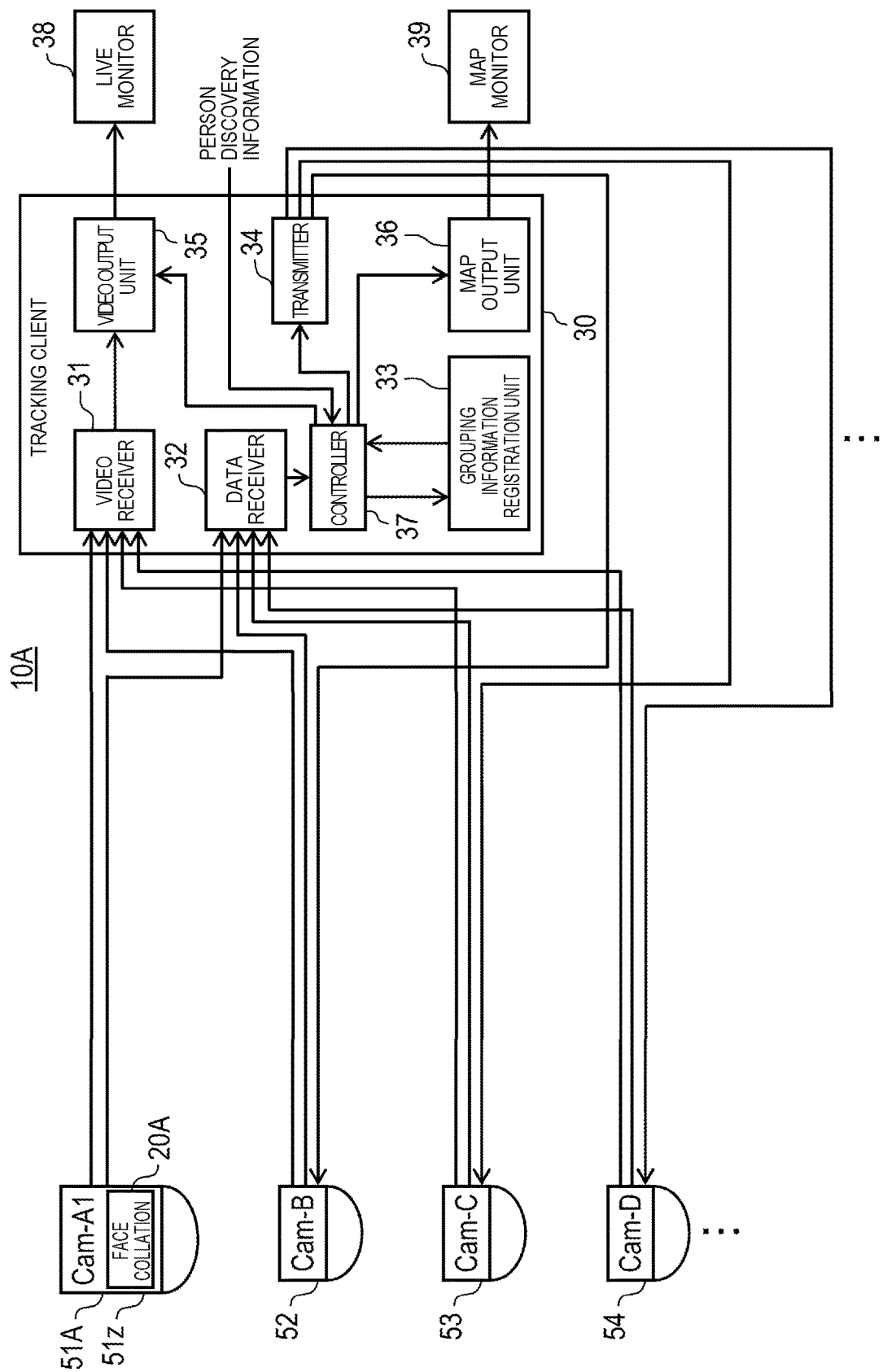
FIG. 12 is a diagram showing an example of a hardware configuration of the surveillance camera system of a modification example of the present embodiment.

FIG. 12 is a diagram showing an example of a hardware configuration of surveillance camera system 10A of a modification example of the present embodiment. Surveillance camera system 10A of a modification example of the present embodiment includes substantially the same configuration as the above-described embodiment. The same reference numerals are used for the same constituent elements as those of the above-described present embodiment and a description thereof will be omitted.

In surveillance camera system 10A, surveillance camera 51A (referred to as "Cam-A1") has a face collation server function of the above-described face collation server 20 in addition to the face detection function. That is, face collation server 20A is accommodated in case body 51z of Cam-A1. In addition, Cam-F has the face detection function and does not have the face collation server function. Other Cam-B to Cam-E are as described above.

Surveillance camera system 10A performs the same operation as the above-described tracking operation, except that Cam-A1 performs collation between the detected face image and the face image of a specific person registered in advance.

In this way, with Cam-A1 having the face collation server function, the configuration of surveillance camera system 10A can be simplified.

The embodiments have been described with reference to the drawings, but it goes without saying that the present disclosure is not limited to such examples. Those skilled in the art will appreciate that various modifications or corrections can be conceived within the scope described in the claims and will understand that those modifications or corrections are naturally also within the technical scope of the present disclosure.

For example, among the multiple screens displayed on live monitor 38, the image of the surveillance camera in which a specific person is currently discovered may be displayed so as to be distinguishable and the image of the surveillance camera in which a specific person is discovered immediately before may be highlighted with another frame. In this way, it is possible to easily identify a surveillance camera in which a specific person is discovered immediately before. In addition, the image of the surveillance camera that the specific person is discovered immediately before may be enlarged and displayed on one screen.

Further, images of the surveillance cameras that have detected the appearance feature until now may be displayed on multiple screens. In this way, it is possible to confirm the trace of a search target while watching the screen imaged by a surveillance camera.

In addition, the tracking client may be equipped with the function of the face collation server, and the configuration of the surveillance camera system can be simplified as well.

Hereinafter, the configuration, action, and effect of the person tracking system and the person tracking method according to the present disclosure will be listed.

One embodiment of the present disclosure is a person tracking system including: a storage device that stores a face image related to a specific person; at least one first detection camera that has a function of detecting face and appearance features of a person; at least one second detection camera that has a function of detecting an appearance feature of the person; a collation device that collates a face image of the person detected by the first detection camera with the face image related to the specific person stored in the storage device; and an instruction device that has grouping information of at least one first detection camera and at least one second detection camera, in which the collation device transmits person feature information including appearance feature information on the specific person to the instruction device in a case where it is determined that the face image of the person detected by the first detection camera is the face image related to the specific person, the instruction device instructs at least one second detection camera grouped in association with the first detection camera to detect the appearance feature information included in the person feature information transmitted from the collation device, and any second detection camera grouped in association with the first detection camera transmits the detection information that is obtained by detecting the appearance feature information transmitted from the instruction device to the instruction device.

In the person tracking system, in a case where it is determined that the face image of the person detected by the first detection camera is the face image related to the specific person, the collation device transmits person feature information including appearance feature information on the specific person to the instruction device. The instruction device instructs at least one second detection camera grouped in association with the first detection camera to detect the appearance feature information included in the person feature information transmitted from the collation device. Any second detection camera grouped in association with the first detection camera transmits the appearance feature detection information that is obtained by detecting the appearance feature information transmitted from the instruction device to the instruction device.

In this way, by using not only highly accurate information (for example, a face) for specifying a person but also low-accuracy information (for example, appearance features such as clothes and belongings) for specifying a person, since the function of detecting the face image of a person with a high processing load is included in some cameras (the first detection cameras) and the function of detecting the appearance feature of a person with a low processing load is included in all cameras (the first detection cameras and the second detection cameras), the person tracking system can suppress the increase in processing load, predict a location of the specific person with high accuracy, and improve the accuracy of tracking.

In addition, one embodiment of the present disclosure is a person tracking system further including a first display device that displays discovery temporary information of a specific person in a case where appearance feature information is detected in any second detection camera grouped in association with the first detection camera.

In this way, the person tracking system can visually confirm discovery temporary information that there is a possibility that a specific person is discovered for the observer who is a user.

In addition, one embodiment of the present disclosure is a person tracking system, in which the first display device displays the images captured with the first detection camera and the images captured with the second detection camera in a comparable manner and further displays discovery temporary information of a specific person in the images captured with the second detection camera.

In this way, the observer is able to know instantly that there is a possibility that a specific person is discovered and on which screen of the first display the specific person is shown while comparing with the images captured by the first detection camera in which the face image is detected.

In addition, one embodiment of the present disclosure is a person tracking system further including a second display device that displays map information of an area in which the first detection camera and the second detection camera are installed, in which the second display device displays a first icon indicating the first detection camera and a second icon indicating the second detection camera in the map information, displays the first icon so as to be distinguishable from other icons with respect to the first icon in a case where the first detection camera detects a face image of the specific person, and displays the second icon so as to be distinguishable from other icons with respect to the second icon in a case where the second detection camera detects the appearance feature information.

In this way, by making the first icon showing the first detection camera that has detected the face image of a specific person (that is, a specific person has been discovered) distinguishable from other icons, the person tracking system allows the observer to instantly recognize which first detection camera has detected a specific person.

In addition, one embodiment of the present disclosure is a person tracking system, in which the second display device displays the first icon so as to be distinguishable from other icons with respect to the first icon in a case where the first detection camera detects a face image of the specific person and further displays the first icon of the other first detection camera and the second icon of the second detection camera, which are grouped in association with the first detection camera, so as to be distinguishable from other icons with respect to the first icon and the second icon.

In this way, the person tracking system allows the observer to easily recognize the position of a detection camera in which a specific person is highly likely to be discovered.

In addition, one embodiment of the present disclosure is a person tracking system, in which the second display device displays a first trace of the specific person as assumption information in the map information in a case where the second detection camera detects the appearance feature information and displays a second trace of the specific person as certain information in the map information in a manner different from the first trace in a case where the first detection camera detects a face image of the specific person.

In this way, the person tracking system clearly distinguishes between uncertain assumption information that is considered that there is a possibility that a specific person has passed and certain information that is properly confirmed that a specific person has passed and to easily predict the position of the specific person.

In addition, one embodiment of the present disclosure is a person tracking system in which the second display device erases the first trace in the case of displaying the second trace of the specific person after displaying the first trace of the specific person in the map information.

In this way, since the second display device erases the uncertain first trace that is considered that there is a possibility that a specific person has passed, the person tracking system can make it easy for the observer to see the accurate second trace that is properly confirmed that a specific person has passed.

In addition, one embodiment of the present disclosure is a person tracking system in which the second display device displays the first trace of the specific person as the assumption information in a case where the travel time of the specific person detected by the first detection camera is longer than a predetermined assumption time.

In this way, the observer can easily determine that there is a concern that a specific person is making a detour and that the first trace may not be accurate.

In addition, one embodiment of the present disclosure is a person tracking system in which the first detection camera and the collation device are accommodated in the same case body.

In this way, the configuration of the person tracking system can be simplified.

In addition, one embodiment of the present disclosure is a person tracking method including: a step of storing a face image related to a specific person in a storage device; a step of storing grouping information of at least one first detection camera that has a function of detecting face and appearance features of a person and at least one second detection camera that has a function of detecting an appearance feature of the person in an instruction device; a step of collating a face image of the person detected by the first detection camera with the face image related to the specific person stored in the storage device; a step of transmitting person feature information including appearance feature information on the specific person to the instruction device in a case where it is determined that the face image of the person detected by the first detection camera is the face image related to the specific person; a step of instructing at least one second detection camera grouped in association with the first detection camera to detect the appearance feature information included in the transmitted person feature information; and a step of transmitting detection information that is obtained by detecting the appearance feature information transmitted from the instruction device to the instruction device.

In this way, by using not only highly accurate information (for example, a face) for specifying a person but also low-accuracy information (for example, appearance features such as clothes and belongings) for specifying a person, since the function of detecting the face image of a person with a high processing load is included in some cameras (the first detection cameras) and the function of detecting the appearance feature of a person with a low processing load is included in all cameras (the first detection cameras and the second detection cameras), the person tracking system can suppress the increase in processing load, predict a location of the specific person with high accuracy, and improve the accuracy of tracking.

INDUSTRIAL APPLICABILITY

The present disclosure is useful as a person tracking system and a person tracking method that predict a location of a specific person by suppressing an increase in processing load with a simple configuration by using highly accurate information for specifying a person and low-accuracy information for specifying a person.

REFERENCE MARKS IN THE DRAWINGS 10, 10A surveillance camera system
20, 20A face collation server
21 feature data acquisition unit
22 face collation unit
23 specific person face information DB
24 data transmitter
30 tracking client
31 video receiver
32 data receiver
33 grouping information registration unit
34 transmitter
35 video output unit
36 map output unit
37 controller
38 live monitor
39 map monitor
40 switching hub
51 to 56, 51A surveillance camera
51i to 56i camera icon
51z case body
61 map image
64A, 64B, 65, 66 trace
231 face image

The invention claimed is:

1. A person tracking system comprising:
a database storage that includes a face image related to a specific person;
at least one first detection camera, which, in operation, performs a face image detection function of a person and detects a face image of a person and performs an appearance feature detection function of a person and detects an appearance feature of a person;
at least one second detection camera which cannot perform a face image detection function of a person, and which, in operation, performs an appearance feature function of a person and detects an appearance feature of a person;
a collation server, which, in operation, collates the face image of a person detected by the first detection camera with the face image related to a specific person included in the database storage; and
an tracking client, including a grouping information registration unit, a controller and a transmitter, the grouping information registration unit, which, in operation, includes grouping information which groups the at least one first detection camera with the at least one second detection camera,
wherein when the collation server determines the face image of the person detected by the at least one first detection camera is the face image related to a specific person, the collation server transmits to the tracking client a camera number of the at least one first detection camera and person feature information including appearance feature information on the specific person whose face image is related to the face image of the person detected by the at least one first detection camera,
the tracking client refers to the camera number and the grouping information and identifies the at least one second detection camera using the camera number and the grouping information and sends the person feature information including appearance feature information on the specific person determined by the collation server as related to the face image of the person detected by the at least one first detection camera to the at least one second detection camera without sending to the at least one second detection camera face image information regarding the specific person and instructs the at least one second detection camera to detect the appearance feature information of the specific person included with the person feature information transmitted from the collation server, and
the at least one second detection camera transmits detection information that is obtained by detecting the appearance feature information of the specific person transmitted from the tracking client to the at least one second detection camera.

2. The person tracking system of claim 1, further comprising:
a first display device that displays discovery temporary information of the specific person in a case where the appearance feature information is detected in any second detection camera grouped with the at least one first detection camera.

3. The person tracking system of claim 2,
wherein the first display device displays images captured with the at least one first detection camera and images captured with the any second detection camera in a comparable manner and further displays discovery temporary information of the specific person in the images captured with the any second detection camera.

4. The person tracking system of claim 1, further comprising:
a second display device that displays map information of an area in which the at least one first detection camera and the at least one second detection camera are installed,
wherein the second display device displays a first icon indicating the at least one first detection camera and a second icon indicating the at least one second detection camera in the map information, displays the first icon so as to be distinguishable from other icons with respect to the first icon in a case where the at least one first detection camera detects a face image of the specific person, and displays the second icon so as to be distinguishable from other icons with respect to the second icon in a case where the at least one second detection camera detects the appearance feature information.

5. The person tracking system of claim 4, wherein the at least one first detection camera includes two or more first detection cameras and wherein the second display device displays the first icon so as to be distinguishable from other icons with respect to the first icon in a case where the at least one first detection camera detects a face image of the specific person and further displays the first icon of other first detection cameras and the second icon of the at least one second detection camera, which are grouped with the at least one first detection camera, so as to be distinguishable from other icons with respect to the first icon and the second icon.

6. The person tracking system of claim 4, wherein the second display device displays a first trace of the specific person as assumption information in the map information in a case where the at least one second detection camera detects the appearance feature information and displays a second trace of the specific person as certain information in the map information in a manner different from the first trace in a case where the at least one first detection camera detects a face image of the specific person.

7. The person tracking system of claim 6, wherein the second display device erases the first trace in the case of displaying the second trace of the specific person after displaying the first trace of the specific person in the map information.

8. The person tracking system of claim 6, wherein the second display device displays the first trace of the specific person as the assumption information in a case where a travel time of the specific person detected by the first detection camera is longer than a predetermined assumption time.

9. The person tracking system of claim 1, wherein the at least one first detection camera and the collation server are accommodated in the same case body.

10. A person tracking method comprising:
storing a face image related to a specific person;
storing, in a tracking client, including a grouping information registration unit, a controller and a transmitter, grouping information which groups (a) at least one first detection camera, which, in operation, performs a face image detection function of a person and detects a face image of a person and performs an appearance feature detection function of a person and detects an appearance feature of a person with (b) at least one second detection camera which cannot perform a face image detection of a person, and which, in operation, performs an appearance feature function of a person and detects an appearance feature of a person;
collating the face image of the person detected by the at least one first detection camera with the stored face image related to a specific person;
determining the face image of the person detected by the at least one first detection camera is the stored face image related to a specific person;
transmitting to the tracking client a camera number of the at least one first detection camera and person feature information including appearance feature information on the specific person whose face image is related to the face image of the person detected by the at least one first detection camera;
referring to the camera number and the grouping information and identifying the at least one second detection camera using the camera number and the grouping information;
transmitting to the at least one second detection camera the person feature information including appearance feature information on the specific person whose face image is related to the face image of the person detected by the at least one first detection camera without sending to the at least one second detection camera face image information regarding the specific person;
instructing at least one second detection camera to detect the appearance feature information of the specific person included with the person feature information transmitted to the tracking client; and
transmitting detection information that is obtained by detecting the appearance feature information of the specific person transmitted from the tracking client to the at least one second detection camera.

11. The person tracking method of claim 10, further comprising displaying discovery temporary information of the specific person in a case where the appearance feature information is detected in any second detection camera grouped with the at least one first detection camera.

12. The person tracking method of claim 11, further comprising displaying images captured with the at least one first detection camera and images captured with the any second detection camera in a comparable manner and further displaying discovery temporary information of the specific person in the images captured with the any second detection camera.

13. The person tracking method of claim 10, further comprising displaying map information of an area in which the at least one first detection camera and the at least one second detection camera are installed,
wherein displaying the map information includes displaying a first icon indicating the at least one first detection camera and a second icon indicating the at least one second detection camera in the map information, displaying the first icon so as to be distinguishable from other icons with respect to the first icon in a case where the at least one first detection camera detects a face image of the specific person, and displaying the second icon so as to be distinguishable from other icons with respect to the second icon in a case where the at least one second detection camera detects the appearance feature information.

14. The person tracking method of claim 13, further comprising displaying the first icon of other first detection cameras and the second icon of the at least one second detection camera, which are grouped with the at least one first detection camera, so as to be distinguishable from other icons with respect to the first icon and the second icon.

15. The person tracking method of claim 13, further comprising displaying a first trace of the specific person as assumption information in the map information in a case where the at least one second detection camera detects the appearance feature information and displays a second trace of the specific person as certain information in the map information in a manner different from the first trace in a case where the at least one first detection camera detects a face image of the specific person.

16. The person tracking method of claim 15, further comprising erasing the first trace in the case of displaying the second trace of the specific person after displaying the first trace of the specific person in the map information.

17. The person tracking method of claim 15, further comprising displaying the first trace of the specific person as the assumption information in a case where a travel time of the specific person detected by the first detection camera is longer than a predetermined assumption time.

* * * * *